US011113778B2

(12) United States Patent
Pimienta et al.

(10) Patent No.: US 11,113,778 B2
(45) Date of Patent: Sep. 7, 2021

(54) SYSTEM AND METHOD FOR INCORPORATING A WAGERING ACTIVITY INTO AN ELECTRONIC COMMERCE TRANSACTION

(71) Applicants: Hugo Enrique Pimienta, Beverly Hills, CA (US); Fernando Pimienta, Mexico City (MX)

(72) Inventors: Hugo Enrique Pimienta, Beverly Hills, CA (US); Fernando Pimienta, Mexico City (MX)

( * ) Notice: Subject to any disclaimer, the term of this patent is extended or adjusted under 35 U.S.C. 154(b) by 0 days.

(21) Appl. No.: 15/997,634

(22) Filed: Jun. 4, 2018

(65) Prior Publication Data

US 2020/0020065 A1    Jan. 16, 2020

(51) Int. Cl.
*G06Q 50/34* (2012.01)
*G06Q 30/06* (2012.01)

(52) U.S. Cl.
CPC ......... *G06Q 50/34* (2013.01); *G06Q 30/0601* (2013.01)

(58) Field of Classification Search
CPC ......... G06Q 20/12; G06Q 30/06–0645; G06Q 30/08; G06Q 50/01; G06Q 50/34; G07F 17/3276; G07F 17/3288
See application file for complete search history.

(56) References Cited

U.S. PATENT DOCUMENTS

| 5,154,420 | A  | * | 10/1992 | Gutknecht | A63F 5/04 463/17 |
| 6,609,969 | B1 | * | 8/2003  | Luciano   | G06Q 10/087 221/131 |
| 7,390,264 | B2 | * | 6/2008  | Walker    | G06Q 30/02 463/40 |
| 7,753,772 | B1 | * | 7/2010  | Walker    | A63F 13/85 463/17 |
| 7,780,522 | B2 | * | 8/2010  | Lutnick   | G07F 17/3253 463/25 |
| 8,758,109 | B2 | * | 6/2014  | Lutnick   | G07F 17/3276 463/16 |
| 9,159,193 | B2 | * | 10/2015 | Walker    | G07F 17/3225 |

(Continued)

OTHER PUBLICATIONS

"Coupon Quest: iOS Game that Rewards Players with Real Stuff," Kickstarter.com, Last updated Feb. 19, 2013, 8pp.; https://www.kickstarter.com/projects/couponquestgame/coupon-quest-rpg-adventure-game-meets-coupon-colle (Year: 2013).*

*Primary Examiner* — Adam L Levine
(74) *Attorney, Agent, or Firm* — Fitzsimmons IP Law

(57) ABSTRACT

A system and method is provided for incorporating a wagering activity into an electronic commerce transaction. The system preferably includes a host device in communication with at least a user device and a merchant device via the Internet. If the merchant does not offer the wagering activity, the user may shop for items offered by the merchant via the host's website. When an item is selected by the user, the item is placed in the host's shopping cart (i.e., the host's virtual shopping cart on the merchant's website). If the user decides to participate in a wagering activity, user payment information is used to transfer funds (e.g., a wagering amount) to the host. If the user wins, host payment information is provided to the merchant and used to purchase the item from the merchant. The item is then provided (shipped) to the user.

10 Claims, 16 Drawing Sheets

(56) References Cited

U.S. PATENT DOCUMENTS

| | | | |
|---|---|---|---|
| 9,595,169 B2* | 3/2017 | Lutnick | G07F 17/3276 |
| 2006/0211482 A1* | 9/2006 | Pimienta | G06Q 20/12 |
| | | | 463/16 |
| 2015/0310497 A1 | 10/2015 | Valin et al. | |

* cited by examiner

| User Account 800 | Login Info 810 | Payment Info 820 | Shipping Info 830 |
|---|---|---|---|
| user_account_1 | user_ID/password | account/verifying_info | shipping_address |
| user_account_2 | user_ID/password | account/verifying_info | shipping_address |
| ... | ... | ... | ... |
| user_account_n | user_ID/password | account/verifying_info | shipping_address |

Figure 8

| Website 900 | Host Account 910 | Login Info 920 | Payment Info 930 |
|---|---|---|---|
| www.xyzstore.com | host_account_1 | user_ID_1/password_1 | account/verifying_info |
| www.xyzstore.com | host_account_2 | user_ID_2/password_2 | account/verifying_info |
| ... | ... | ... | ... |
| www.xyzstore.com | host_account_n | user_ID_n/password_n | account/verifying_info |

Figure 9

| Session 1000 | User Account 800 | Website 900 | Host Account 910 | Session Details 1002 |
|---|---|---|---|---|
| session_1 | user_account_1 | www.xyzstore.com | Host_account_1 | cart, wager, etc. |
| session_2 | user_account_2 | www.xyzstore.com | Host_account_2 | cart, wager, etc. |
| ... | ... | ... | ... | ... |

Figure 10

| Session 1000 | Cart 1100 | Purchase 1102 | Wager 1104 | Wager Details 1106 |
|---|---|---|---|---|
| session_1 | quantity, item, etc. | $200.00 | $100.00 | selection, algorithm, etc. |
| session_2 | quantity, item, etc. | $39.99 | $39.99 | selection, algorithm, etc. |
| ... | ... | ... | ... | ... |

| Session 1000 | Selection 1300 | Seed Source 1202 | Seed Algorithm 1204 | Seed 1206 | PRNG 1208 | Outcome 1210 |
|---|---|---|---|---|---|---|
| session_1 | heads | 1234567890 | algorithm_1 | 12345 | PRNG_1 | heads |
| session_2 | tails | 1234567890 | algorithm_2 | 67890 | PRNG_2 | heads |
| ... | ... | ... | ... | ... | | |

SYSTEM AND METHOD FOR INCORPORATING A WAGERING ACTIVITY INTO AN ELECTRONIC COMMERCE TRANSACTION

BACKGROUND OF THE INVENTION

1. Field of the Invention

The present invention relates to a system and method for using a network-connected host device to facilitate a transaction, wherein the transaction involves the purchase of an item from a merchant, where a user can wager (e.g., with the host device) for a least a portion of the purchase price of the item prior to purchasing the item, thereby allowing the user to acquire the item for less than the purchase price when the user wins the wager (e.g., a coin flip).

2. Description of Related Art

The Internet is used daily by hundreds of millions of people for a variety of reasons, including research, social networking, shopping, and gambling, to name a few. With respect to shopping, there are hundreds of thousands of websites (i.e., merchants) selling products over the Internet. While these websites differ in the types of products that they sell, and the prices at which the products are sold, the checkout (or backend payment) process is virtually identical. Once an item is selected, the item is placed in a virtual shopping cart, and paid for using a payment method provided by the user. Once the payment is successfully processed (e.g., using a payment gateway, payment processor, merchant account, etc.), the item is then provided (e.g., shipped) to the user.

The problem with this is that all ecommerce websites are competing for the same (or an overlapping group of) users. While most websites offer some feature to differentiate themselves, like free shipping, greater selection, lower prices, product reviews, etc., it is becoming harder and harder to stand out on the Internet and compete with giants like eBay™, Amazon™, and Google™.

It would therefore be advantageous to operate a website that either competes with or supplements existing ecommerce websites by offering a feature that is not currently available on the Internet, i.e., allowing a user to participate in a wagering activity to reduce or eliminate the purchase price of an item, where the wagering activity is relatively simple (e.g., flipping a coin), and can be performed in a manner that is transparent, trustworthy, and verifiable.

While the growth of gambling is explosive, it is typically an isolated activity (e.g., not combined with facilitating a transaction), and is difficult to implement on the Internet, where actual coins, cards, dice, etc. are not used. When a user visits an online casino, their biggest concern is whether the casino is legitimate, and whether outcomes are fair and accurate. This is because most users (both gamblers and non-gamblers alike) feel that online casinos are untrustworthy, where outcomes are skewed to favor the house. For examples, if an individual wins a small hand and loses a big hand at a brick-and-mortar casino (e.g., in Las Vegas), the individual will generally leave feeling unlucky. Whereas, if an individual wins a small hand and loses a big hand at an online casino, the individual will generally leave questioning the legitimacy of the website, wondering if they outcome was rigged or predetermined.

The present invention provides a novel platform that address drawbacks associated with Internet gambling (e.g., trustworthiness, transparency, etc.). The platform also overcomes technical difficulties associated with incorporating a wagering activity into an ecommerce transaction. For example, the merchant offering the item for sale may not, for whatever reason (e.g., legal, financial, social, moral, etc.), offer wagering activities. Thus, a new and improved platform is necessary to allow a user to participate in a wagering activity when purchasing an item from a merchant, where the merchant is not involved (and perhaps not aware) of the wagering activity. The platform may also shield the user from the merchant, leading the user to believe that the item is being purchased from the entity (e.g., host) that is offering the wagering activity.

Not only is the present invention distinguishable from ecommerce and gambling websites that are currently available on the Internet, but it improves upon those websites by offering features that are currently not available. It also does so in a way that is convenience, trustworthy, and provide the user with a pleasurable experience. As discussed below, advancements in computer technology are required to implementing the present invention on the Internet, and address drawbacks associated therewith (e.g., interfacing with existing ecommerce websites, providing a trustworthy and transparent gaming experience for the user, etc.).

SUMMARY OF THE INVENTION

The present invention provides a system and method for using a network-connected host device to facilitate a transaction, where the transaction involves the purchase of an item from a merchant, where the user can wager for at least a portion of the purchase price of an item prior to purchasing the item, thereby allowing the user to acquire the item for less than the purchase price when the user wins the wager. Preferred embodiments of the present invention operate in accordance with a host device in communication with a user device, a merchant device, and a financial device via a wide area network (WAN), such as the Internet.

In a first embodiment of the present invention, a merchant (i.e., an ecommerce website offering items for sale) is responsible for offering and performing the wagering activity. In this embodiment, the user would select the merchant (e.g., by entering their URL into the address bar of a web browser, selecting the merchant from a search result, etc.), and provide login information (e.g., user name, password, etc.). The login information is used to authenticate the user and identify the user's account with the merchant. Shopping as a guest is also acceptable but may require the entry of other information (e.g., payment information) at a later time.

The user would then search the merchant's website and select an item. The item would then be placed in the user's shopping cart (i.e., a virtual shopping cart that is linked to the user's session with the merchant). The user may then be asked if he/she would like to participate in a wagering activity. If the answer is YES, then funds are received (or at least secured) from the user, which may be accomplished via a payment method provided by the user, or previously provided by the user and linked to the user's account with the merchant. If the wager is won, then the item is provided (e.g., shipped) to the user. If the wager is lost, the user may have the option of placing another wager. If the user declines, or the answer is NO when originally asked to participate in a wagering activity, the user may have an option to purchase the item (e.g., for the original purchase price). If the user decides to purchase the item, then the user would provide payment information, or previously provided payment information would be used (e.g., as linked to the user's account with the merchant), and the item would be provided (shipped) to the user.

In a second embodiment of the present invention, the merchant (i.e., an ecommerce website offering items for sale) is not involved in the wagering activity. Instead, the wagering activity is offered by a host in communication with both the merchant and the user via the Internet. In this embodiment, the user may provide login information (e.g., user ID, password, etc.) to the host device, which may be used to authenticate the user and identify the user's account with the host. Shopping as a guest is also acceptable but may require the entry of other information (e.g., payment information) at a later time. The user may then select a merchant and be provided with information on items that are available from that merchant. Alternatively, the user may be provided with information on items that are available from the host (e.g., items that are available from merchants offered by the host, where the merchant's identity is either provided to the user or withheld) (design choice).

An item would then be selected and placed in the host's shopping cart (i.e., a virtual shopping cart that is linked to the host's session on the merchant). In this embodiment, the user does not have an active session with the merchant; just with the host. The user may then be asked if he/she would like to participate in a wagering activity. If the answer is YES, then funds are received (or at least secured) from the user, which may be accomplished via a payment method provided by the user, or previously provided by the user and linked to the user's account with the host. If the wager is won, then the host purchases the item from the merchant (e.g., by providing the merchant with host payment information), and has the item provided (e.g., shipped) to the user. If the wager is lost, the user may have the option of placing another wager. If the user declines, or the answer is NO when originally asked to participate in a wagering activity, the user may have the option of purchasing the item (e.g., for the original purchase price). If the user decides to purchase the item, then funds would be received (or at least secured) from the user (e.g., using user payment information), and the host would purchase the item from the merchant (e.g., using host payment information). The item would then be provided (e.g., shipped) to the user.

It should be appreciated that, in this embodiment, the user is shopping on (or logged into) the host's website, whereas the host is shopping on (or logged into) the merchant's website. When the user selects an item, the item is placed in the host's virtual shopping cart on the merchant's website. This is done to secure the item, making the item available later (e.g., after the wagering activity, etc.). If the user decides not to purchase the item (e.g., loses the wager, etc.), the host removes the item from the cart. If, however, the user wins their wager (e.g., wins the item, or wins a portion of the item and pays the remainder to the host), then the host will purchase the item from the merchant. This is referred to herein as a "dual shopping experience," which allows the item to be selected by the user (via the user's shopping experience with the host) and purchased by the host (via the host's shopping experience with the merchant).

Because the merchant in this embodiment is oblivious to the wagering activity, the item price does not change regardless of whether the user wins or loses their wager. Thus, the merchant is expecting full price, and the user is expecting a reduced price if the wager is won. This is accomplished using the dual shopping experience, where the host either makes money if the user loses the wager or loses money of the user wins the wager. It should be appreciated that while the host may win or lose money on a given session (e.g., a single coin flip), if the odds of the wagering activity is 1:1 (such as a coin flip), the host should break even in the long run. Other revenue streams would then have to be utilized to turn a profit (e.g., advertising, charging the user a fee, charging the merchant a fee, etc.).

In a third embodiment of the present invention, the merchant (i.e., an ecommerce website offering items for sale) is not involved in the wagering activity. Like the second embodiment, the wagering activity is offered by a host in communication with both the merchant and the user via the Internet. In this embodiment, however, the user is free to surf the Internet and purchase items from merchants of their choice. In other words, they are not shopping on the host's website. Instead, they are shopping directly with the merchant, via the user's virtual shopping cart.

In this embodiment, the host is either loaded, opened, or logged into, so that it is operating while the user is shopping on the Internet. The host functions by monitoring the user device's activity and waiting for the user to make (or attempt to make) a purchase. Once the user has selected an item from the merchant and placed the item in the user's cart, the merchant may then allow the user to purchase the item. At this time (or other times as may be convenience), the host, which is monitoring the user's session with the merchant, intervenes (e.g., via a pop-up, etc.) and asks the user if they would like to participate in a wagering activity. If the answer is NO, then the user continues with the merchant, e.g., providing them payment information (i.e., user payment information) and having the item provided (e.g., shipped) to the user. If, however, the answer is YES, then the host receives (or secures) funds from the user, which may be accomplished via a payment method provided by the user, or previously provided by the user and linked to the user's account with the host. If the wager is lost, then the user may be provided with another opportunity to wager. If the wager is won, then the item is purchased by the host and provided (e.g., shipped) to the user.

Unlike the second embodiment, it is the user here that has an active session with the merchant. Thus, for the host to purchase the item from the merchant, the host will need to provide host payment information to the merchant. This may be accomplished use the user's web browser (i.e., the user's session with the merchant). For example, when payment information is requested from the user, the host may intervene and populate the fields with host payment information (instead of user payment information), thereby allowing the host to purchase the item from the merchant. The item then is provided (e.g., shipped) to the user.

While the present invention is not limited to any particular wagering activity, it is preferred that the activity be a coin flip (for simplicity, etc.) and determined using a Random Number Generator (RNG). In one embodiment of the present invention, to instill a level of confidence with the user, the outcome may be determined using a Pseudo Random Number Generator (PRNG). A PRNG uses a seed (e.g., a random seed) to determine a random number, or outcome. One advantage of this algorithm is, if the PRNG remains fixed, it is the random seed that ensures a random outcome. Thus, to ensure a random outcome—one that is not manipulated by the host to achieve a particular outcome—the seed should be acquired from an outside independent source. For example, the seed could be the time of day (e.g., down to the millisecond, as determined by the atomic clock), the national debt, or any other value that is constantly changing, and (preferably) changing at a rapid pace. When the user's initiates the wager (e.g., by clicking a "Flip!" button), this initiation may trigger the host to retrieve a seed from the designated (preferably external) source.

In another embodiment of the present invention, the user may not only determine WHEN the seed source is captured but determine the CONTENT of the seed. For example, when the user initiates a wagering activity (e.g., clicks the "Flip!" button), data packets are provided from the user computer to the host computer via the Internet (e.g., informing the host computer that the user has clicked on the "Flip!" button). These data packets may include different headers, such as TCP, IP, and HTTP. These headers can be used (in whole or in part) as the seed for PRNG. For example, the user device's IP address and date/time (as included in the HTTP request) could be used as the seed for the PRNG. By determining the seed in this fashion, the user should feel confident that the system is trustworthy, and that the outcome is truly random.

A more complete understanding of a system and method for using a network-connected host device to facilitate a transaction, wherein the transaction involves the purchase of an item from a merchant, where the user can wager for at least a portion of the purchase price of the item prior to purchasing the item, will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIGS. 3A-L provide exemplary screen shots in accordance with the first embodiment of the present invention;

FIGS. 5A-L provide exemplary screen shots in accordance with the second embodiment of the present invention;

FIG. 8 provides an exemplary database for storing user information, or information on users that have accounts with the host;

FIG. 9 provides an exemplary database for storing website information, or information on ecommerce websites that are offered (or supported) by the host;

FIG. 10 provides an exemplary database for storing a session information, or information on each user session with the host;

DETAILED DESCRIPTION OF THE PREFERRED EMBODIMENT

The present invention provides a system and method for using a network-connected host device to facilitate a transaction, wherein the transaction involves the purchase of an item from a merchant, where the user can wager for a least a portion of the purchase price of the item prior to purchasing the item, thereby allowing the user to acquire the item for less than the purchase price when the user wins the wager.

It should be appreciated that while the present invention is described in terms of three embodiments, where the wagering activity is a coin flip, the present invention is not so limited. For example, other embodiments, such as a pure gaming website, as opposed to an ecommerce website with a gaming component, is within the spirit and scope of the present invention. By way of another example, other wagering activities, such as rolling at least one die (e.g., craps, etc.), exposing at least one card (e.g., blackjack, poker, baccarat, etc.), spinning at least one wheel or reel (e.g., slot machine, roulette, etc.), or predicting an outcome of an event (e.g., sports betting, etc.), is within the spirit and scope of the present invention. In fact, the wagering activity could be any gaming activity generally known to those skilled in the art, or any gaming activity offered in a brick-and-mortar casino, using real or virtual elements (e.g., virtual cards, virtual dice, etc.).

It should be appreciated that coin flipping is used in the embodiments discussed herein, and is preferred, because coin flipping is easy to understand, simply to perform, and a true 50% chance of predicting the correct outcome (i.e., the odd of heads or tails is 50/50). This is important because it provides the user with a gaming activity that (i) everyone knows and (ii) neither the host (e.g., house) nor the user (e.g., player) has the advantage. As explained further below, because heads or tails is 50/50, the host does not make money by having an advantage, and therefore must make money in other ways (e.g., by charging the user a fee to shop and/or wager on the website, by charging the merchant a fee or receiving a discount or commission from the merchant for facilitating a transaction with the merchant, by drawing traffic to the website (e.g., advertising revenue, etc.), etc.).

Figure 1:
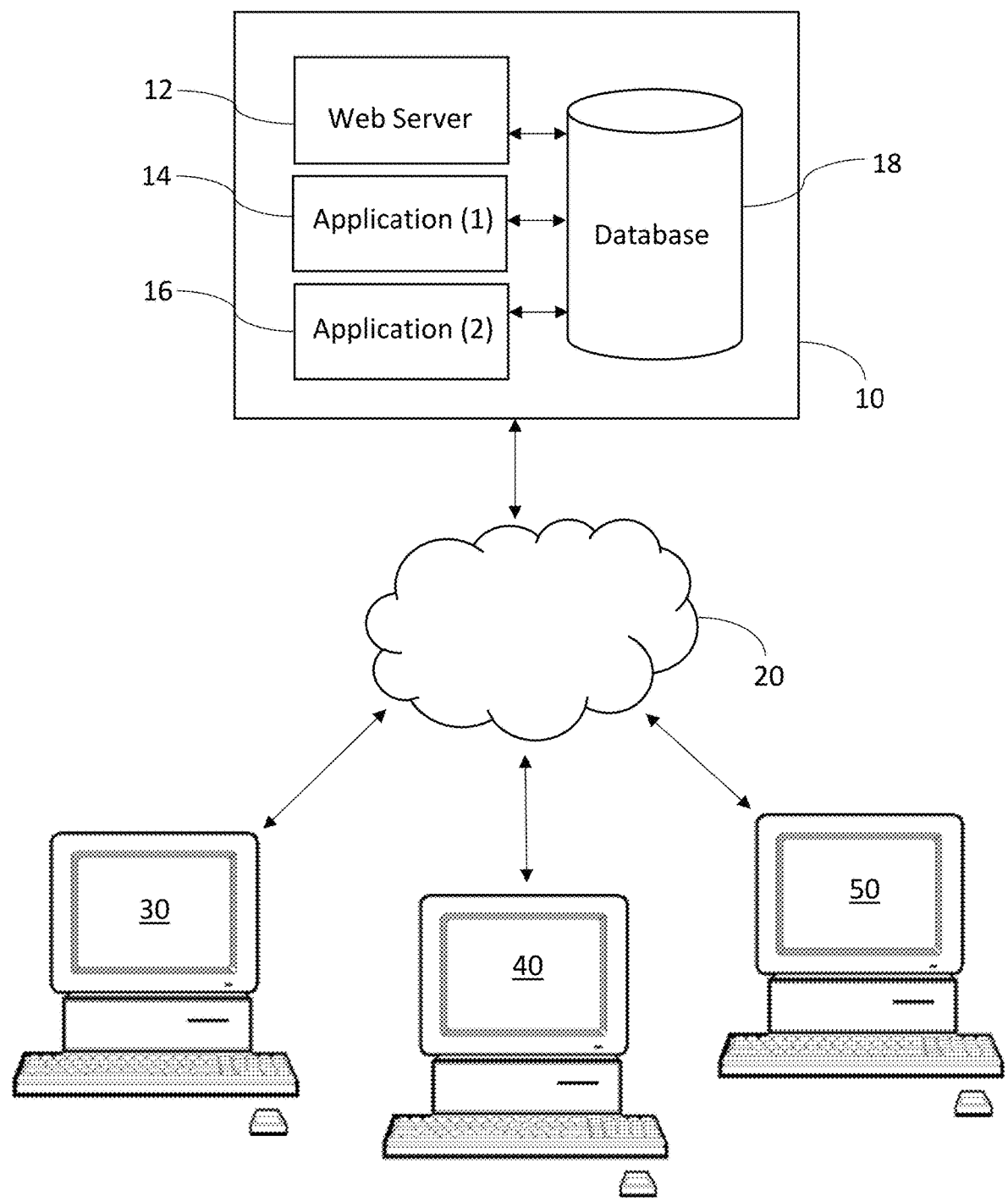
FIG. 1 illustrates an exemplary environment in which the present invention may operate, in which a host device communicates with a user device, a merchant device, and a financial device via a wide area network (WAN), such as the Internet.

In a preferred embodiment of the present invention, as shown in FIG. 1, a host device 10 may communicate with a user device 30, a merchant device 40, and/or a financial device 50 via a wide area network 20, such as the Internet. The host device 10 may include a web sever 12, allowing the host device 10 to communicated with the users, merchants, and/or financial institutions (e.g., Citibank, Mastercard, Visa, PayPal, Zelle, etc.) via the WAN 20, a database 18 for storing information (e.g., information on users, merchants, financial institutions, sessions, etc., program (or application) instructions (e.g., machine readable), etc.), a first application 14 allowing a user to participate in a wager activity to reduce or eliminate a purchase price of an item, and a second application 16 for performing the wager activity.

It should be appreciated that the present invention is not limited to the arrangement and/or components depicted in FIG. 1, and may include a different arrangement, different components, fewer components, or additional components. For example, as discussed below, the merchant device may be responsible for offering and/or performing the wagering activity. The merchant may do so using a separate, stand-alone, network-connected host device, as shown in FIG. 1, or by embedding the structure and/or functionality of the host device within the merchant device. By way of another example, the host device may use one or more databases (or memory devices), located locally and/or remotely, and one or more applications (or programs), located locally and/or remotely. In other words, as long as the host can perform the functionality described herein, it does not matter whether it is performed on a single or multiple devices, by a single or multiple applications (or programs), or utilize a single or multiple databases (or memory devices).

Figure 2:
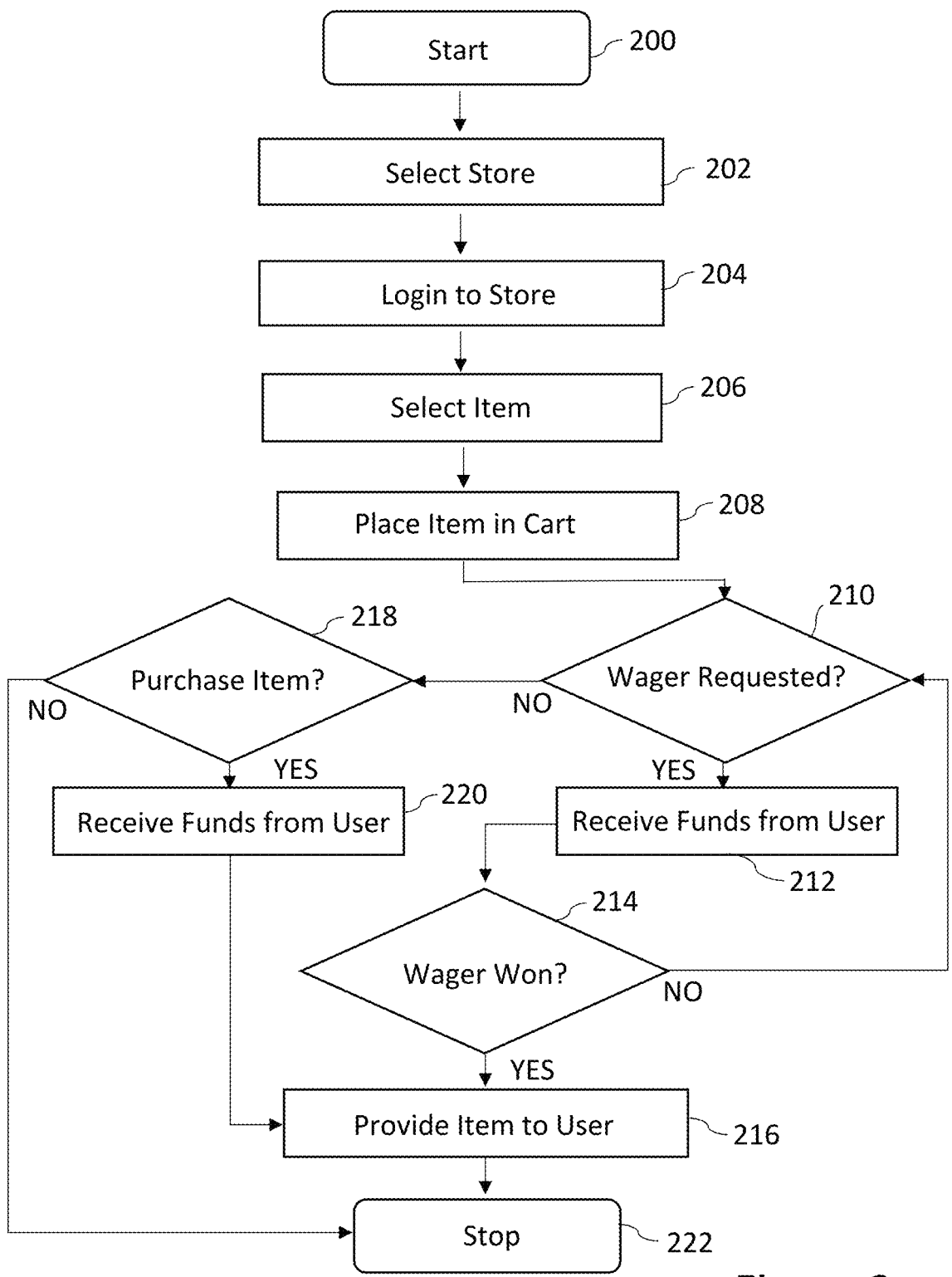
FIG. 2 illustrates a method for incorporating a wagering activity into an ecommerce transaction in accordance with a first embodiment of the present invention.

In a first embodiment of the present invention, the merchant (i.e., an ecommerce website offering items for sale, such as Amazon™) is responsible for offering and performing the wagering activity. In this embodiment, as shown in FIG. 2, the method starts at step 200, where the user selects an online merchant at step 202, which may be accomplished by entering the merchant's Uniform Resource Locator (URL) (e.g., www.amazon.com) into the address bar of a web browser, or by clicking on a hyperlink for the merchant from a search result (e.g., Google™ search result). The user may then login to the merchant's website at step 204, which may require the user entering authenticating information, such as user name, password, biometric data, etc. Alternatively, the user could enter the merchant's website as a guest.

The user may then search (or browse) the merchant's website and select an item to purchase at step 206. The item is then placed in the user's virtual shopping cart on the merchant's website (i.e., a virtual shopping cart that is linked to the user's session with the merchant) at step 208. The user may then be asked if he/she wants to wager to reduce or eliminate the purchase price for the selected item at step 210. If the answer is YES, then funds are received (or at least secured) from the user at step 212, which may be accomplished via a payment method provided by the user, or previously provided by the user and linked to the user's account with the merchant. If the wager is won at step 214, then the item is provided (e.g., shipped) to the user at step 216, ending the method at step 222.

It should be appreciated that the method may involve receiving (or at least securing) additional funds from the user before the item is provided (e.g., shipped) to the user at step 216, depending on the amount wagered and the amount received at step 212. For example, if the purchase price (e.g., price for the item, price to ship the item, etc.) is $200, the wager amount is $100, and the wager amount was received at step 212, then no additional funds are due. This is because the wagering activity was performed with the understanding that the user would get the item for $100 (paid at step 212) if the user won the wager. By way of another example, if the wager amount is $50, and the wager amount was received at step 212, then an additional $100 would be due. This is because the wagering activity was performed with the understanding that the user would get the item for $50 less (i.e., $150) if the user won the wager. And because the user already paid $50 (i.e., the wager amount) at step 212, an additional $100 is due. Thus, the need to receive (or secure) additional funds is based on the purchase price (e.g., price of the item, price to ship the item, etc.), the wagering amount, and the amount of funds already received from the user. Simple math can be used to determine whether a balance is due before the item is provided to the user.

The same math can be used to determine whether money should be refunded to the user or a security hold released. For example, if the purchase price is $200, the wager amount is $200, and the wager amount was received at step 212, then $200 would need to be refunded to the user. By way of another example, if the purchase price is $200, the wager amount is $200, and the user's payment method was used to secure $200 (i.e., a security hold was placed on $200), then the security hold would need to be released. As will be apparent to those skilled in the art, whether funds are received, secured, returned, and/or released is a design choice. Funds can be secured or received. If the user wins the wager, and the amount secured or received is greater than the amount due, then the balance will be released or returned. If the user wins the wager, and the amount secured or received is less than the amount due, then the balance will be secured or received, preferably before the item is provided to the user. What is preferred, however, is that the amount wagered is received or secured before the wagering activity, or before the user wins or loses their bet, hence the reason for receiving certain funds (i.e., at least the amount wagered) at step 212.

With reference back to FIG. 2, if the user loses at step 214, the user may have the option of placing another wager at step 210. If the answer is NO at step 210, the user may have the option of purchasing the item at step 218. If the answer is YES, funds are received from the user at step 220 (i.e., the purchase price), the item is provided (e.g., shipped) to the user at step 216, ending the method at step 222. Alternatively, if the answer is NO at step 218, the method comes to an end at step 222, as the user has decided not to wager or purchase the item.

It should be appreciated that the first embodiment of the present invention is not limited to the method recited in FIG. 2, and other methods including fewer, additional, or different steps are within the spirit and scope of the present invention. For example, as discussed above, funds may be secured instead of received at step 212. By way of another example, funds may be secured, received, released, or returned before step 216, depending on a balance due or owed after the wagering activity (see discussion above). By way of yet another example, step 218 may be performed before step 210. By way of yet another example, step 204 may be deleted if the user proceeds as a guest, which would require a step of the user providing a payment method (i.e., a payment method that otherwise would be linked to the user's account if the user had logged in).

Figure 3A:
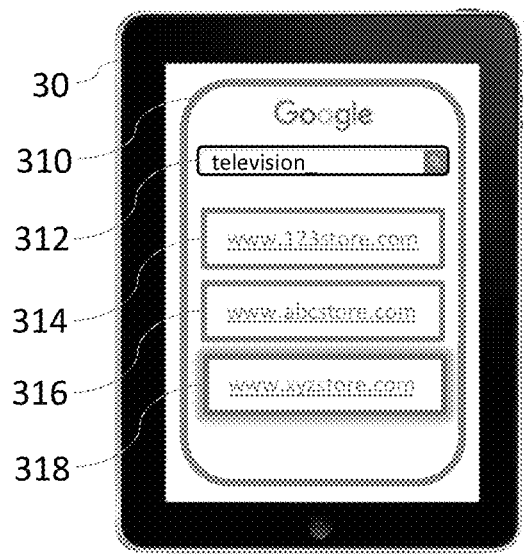
Figure 3B:
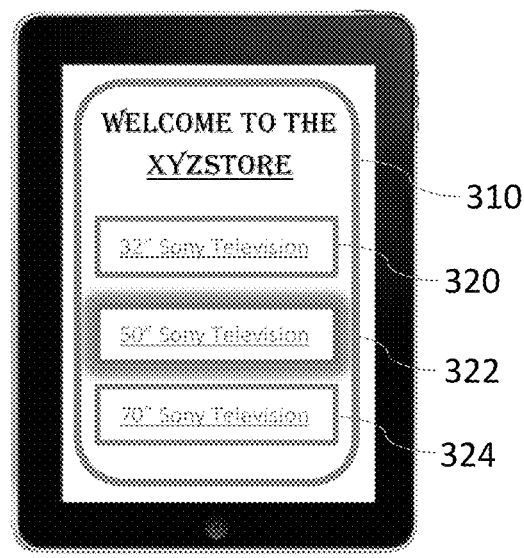
Figure 3C:
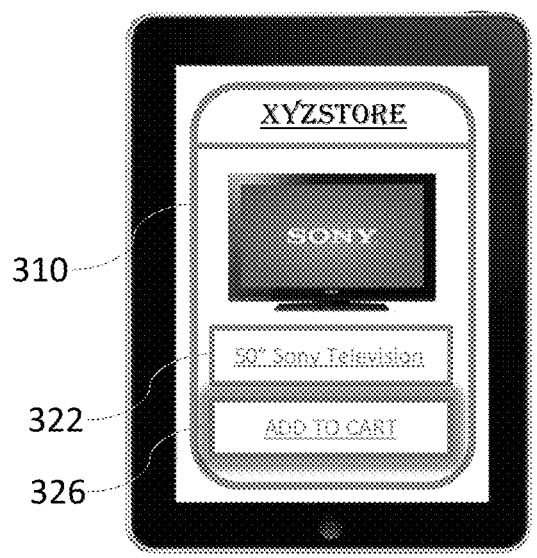

Exemplary screen shots of the first embodiment of the present invention can be seen in FIGS. 3A-K. As shown in FIG. 3A, a user may use a user device 30 in communication with a merchant device (not shown) via the Internet (not shown). It should be appreciated that while the user device is depicted in FIG. 1 as a desktop computer, and FIG. 3A as a tablet, the present invention is not so limited. For example, the user device could be a smartphone, a smartwatch, a tablet, a laptop, a personal computer, a smart appliance, or any other network-connected device generally known to those skilled in the art.

As shown in FIG. 3A, a user may open a web browser 310, such as Safari™, Chrome™, Internet Explorer™, etc., and enter a search engine into the address bar, such as www.google.com. The search engine can then be used to search for a particular item, such as a television 312. In response, the search engine may return a plurality of merchants (or stores) that sell televisions, including the 123store, having the Uniform Resource Locator (URL) www.123store.com 314, the abcstore, having the URL www.abcstore.com 316, and the xyzstore, having the URL www.xyzstore.com 318. The user can then select one of the merchants (or stores) by clicking an associated hyperlink. The web browser 310 may then be used to display content from the selected store. Alternatively, instead of searching for a store, the user could just enter its URL (if known) into the address bar of the web browser 310. Any other method of directing the user's web browser to a store (e.g., using a "Favorites" pulldown menu, clicking on a shortcut, etc.) is within the spirit and scope of the present invention.

Referring back to FIG. 3A, if the user selects the xyzstore (e.g., by clicking on the hyperlink for www.xyzstore.com), the user will be presented with content from the xyzstore. See FIG. 3B. Such content may include a 32-inch Sony™ television 320, a 50-inch Sony™ television 322, and a 70-inch Sony™ television. If the user selects the 50 inch Sony™ television (e.g., by clicking on the hyperlink associated with the "50" Sony Television"), the user may be presented with information on the selection, including an image of the selection and information on the selection 322. The user may then have the option of adding the selection to their virtual shopping cart (i.e., a virtual shopping cart associated with the user's session with the xyzstore).

Figure 3D:
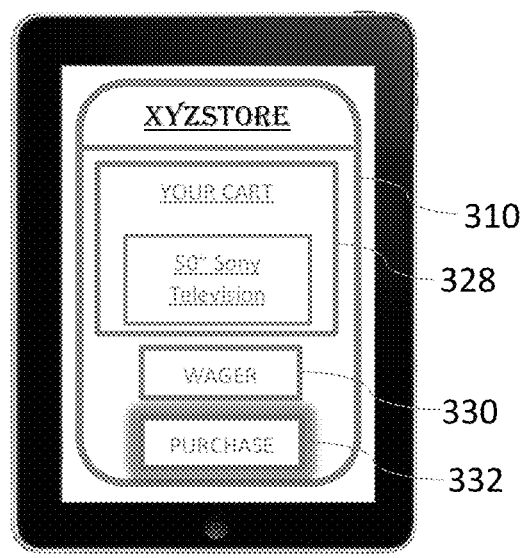
Figure 3E:
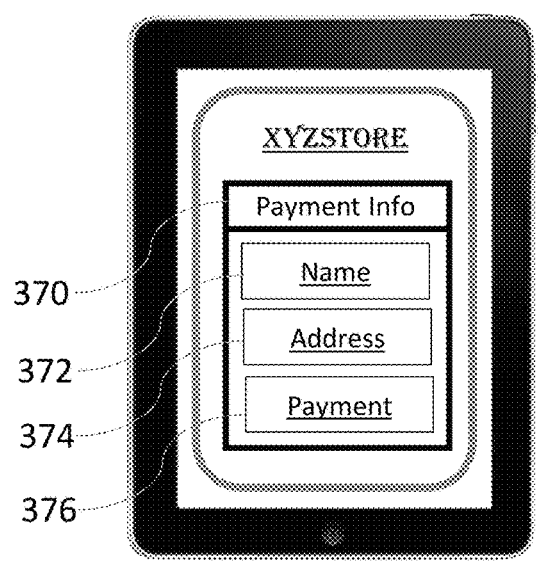

As shown in FIG. 3D, the user may then be provided with the content of their virtual shopping cart 328, which in this example is the 50-inch Sony™ television, with options to either wager to reduce or eliminate the purchase price of the television or pay the purchase price of the television. If the user is not interested in gambling, the user can select the "Purchase" button 332. As shown in FIG. 3E, the user would then enter payment information 370, which may include the user's name 372, address 374, and a payment method 376 (e.g., Citibank, Mastercard, Visa, PayPal, Zelle, etc.). Other information may also be required, such as shipping information (not shown). Alternatively, if the user logged into the xyzstore website upon arrival, payment and/or shipping information linked to the user's account (as previously provided) may be used to facilitate the transaction.

Figure 3F:
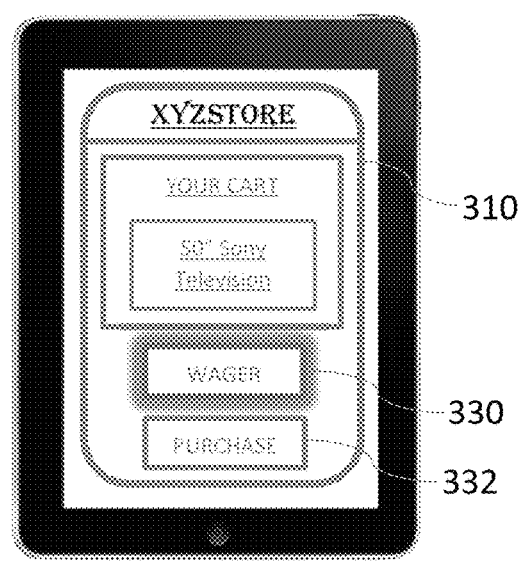
Figure 3G:
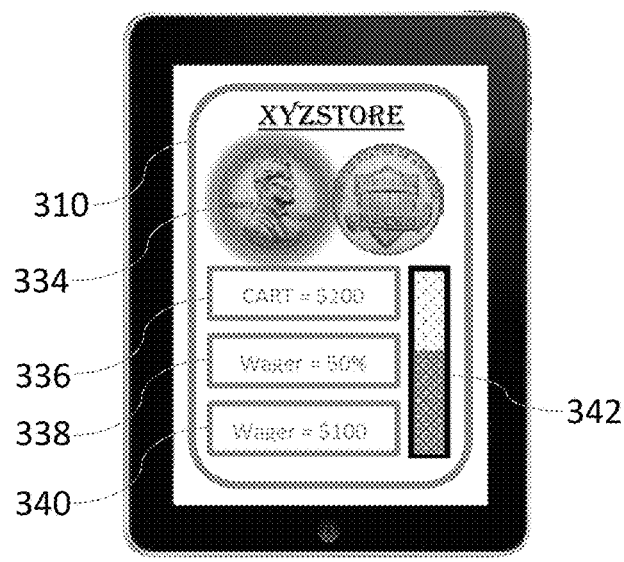

In FIG. 3F, if the user is interested in gambling, the user can select the "Wager" button 330. As shown in FIG. 3G, the user can then predict an outcome, which in this example is either head or tails 334. The user can then decide how much the user would like to wager. This may be accomplished by sliding a bar 342, entering an amount 340, entering a percentage 338, or it may be fixed (or capped) by the system (not shown). In this example, the television costs $200 and the user has chosen to wager 50%, or $100. Thus, if the user wins the wager, the user can purchase the television for $100. If the user loses the wager, the user loses their $100 wager, and the television purchase price remains at $200.

Figure 3H:
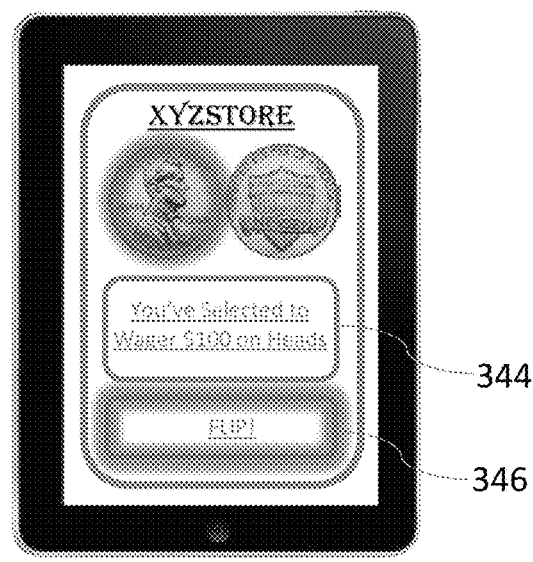
Figure 3J:
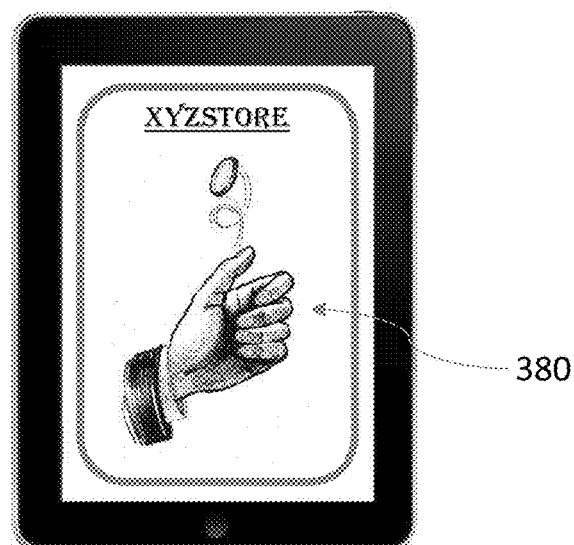

As shown in FIG. 3H, once the user has set the wager, the merchant may provide the user with a summary of the wager 344, and an opportunity to initiate the flipping of a coin (e.g., by pressing the "Flip!" button). As described later, this initiation of the flip is important in that it may be used to determine the outcome of the wager, thereby ensuring that the wager is conducted in a fair, transparent, and verifiable manner. A coin may then be flipped. This may be done in different ways, including but not limited to, animation of a coin being flipped (see, e.g., FIG. 3J), video of a person flipping a coin (not shown), or merely showing an outcome (see, e.g., FIGS. 3K and L).

Figure 3K:
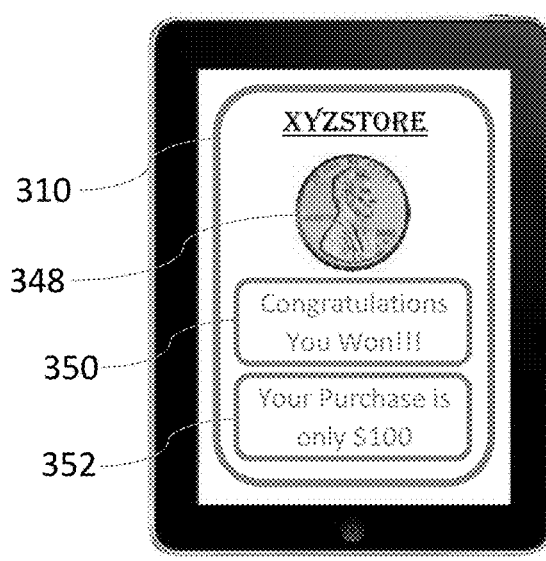
Figure 3L:
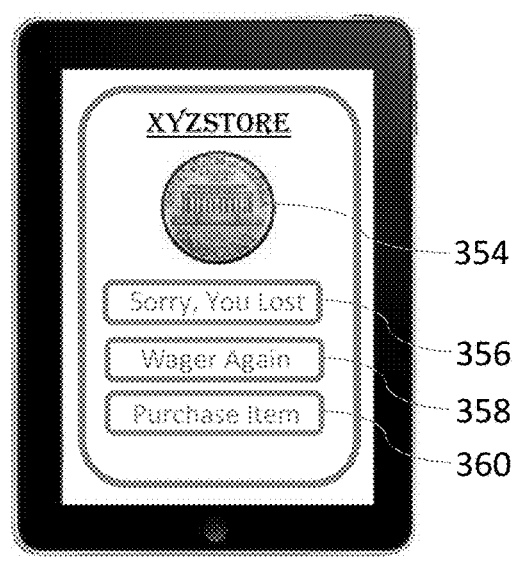

As shown in FIG. 3K, if the user's predicted outcome matches the outcome of the wager (e.g., the user selects heads and the upward facing surface of the coin is heads), then the user will be notified that they won 350, and that the item has been purchased for a reduced or null amount 352 (depending on the wager amount). As shown in FIG. 3L, if the user's prediction outcome does not match the outcome of the wager, then the user is notified that they lost 356, and given the option to wager again 358, or purchase the item 360 (e.g., at the original purchase price). If the user decides to wager again, the user will be given content similar to that shown in FIG. 3G. Alternatively, if the user decides to purchase the item, the user will be presented with content similar to that shown in FIG. 3E.

It should be appreciated that the first embodiment of the present invention is not limited to the screen shots shown in FIGS. 3A-K. For example, the wagering activity may be something other than flipping a coin, or the user may be allowed to select from a plurality of wagering activities (e.g., flip a coin, roulette, dice, etc.). The user should preferably receive the true odds benefit of the wager. If the odds are 1:1, then the user should be able to purchase the item for half the purchase price if the wager is won. If the odds are 4:1, then the user should be able to purchase the item for a quarter of the purchase price if the wager is won.

Figure 4:
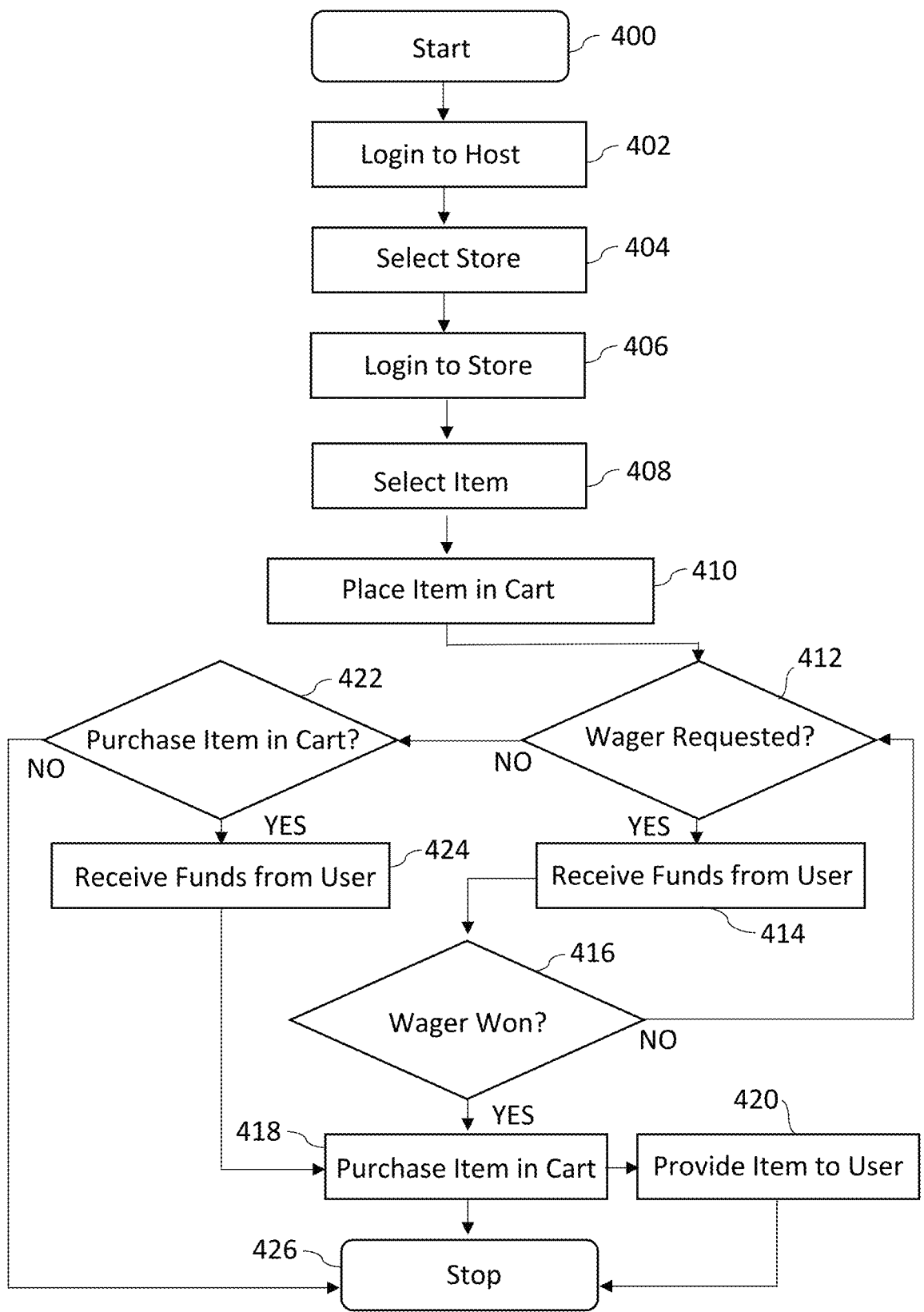
FIG. 4 illustrates a method for incorporating a wagering activity into an ecommerce transaction in accordance with a second embodiment of the present invention.

In a second embodiment of the present invention, the merchant (i.e., an ecommerce website offering items for sale, such as Amazon™) is not involved in the wagering activity. Instead, the wagering activity is allowed and operated by a host in communication with both the merchant and the user via the Internet. In this embodiment, as shown in FIG. 4, the method starts at step 400, where the user logs into the host device at step 402. The login information (e.g., user name, password, biometric data, etc.) is used to authenticate the user, and identify the user's account on the host. Alternatively, the user may proceed as a guest. At step 404, the user may then select a merchant (or store) from a plurality of merchants (or stores) available on the host. The host then logs into the selected merchant at step 406. The login information (e.g., user name, password, etc.) is used to authenticate the host, and identify the host's account with the merchant. This is a crucial part of this embodiment. While the user is shopping on the host's website, it is the host that is shopping on the merchant's website. In other words, the merchant receives payment from the host, whereas the host receives payment from the user. If the user loses their wager, then money is only provided to the host. If, however, the user wins their wager, then money is also provided to the merchant, where more money is paid to the merchant than is received from the user (due to the user winning their wager).

Referring back to FIG. 4, the user is allowed to select an item offered by the merchant at step 408. The item is then placed in the virtual shopping cart at step 410. Unlike the first embodiment, the virtual shopping cart here is associated with the host's session with the merchant. In other words, the item selected by the user is placed in the host's virtual shopping cart (i.e., on the merchant's website). The user may then decide to wager at step 412. If he/she does, then funds are received (or at least secured) from the user at step 414, which may be accomplished via a payment method provided by the user, or previously provided by the user and linked to the user's account with the host. If the wager is won at step 416, then the item is purchased by the host at step 418, and provided (e.g., shipped) to the user at step 420, ending the method at step 426. Preferably, a host payment method is used to purchase the item from the merchant, but a shipping address for the user is provided to the merchant, allowing the item to be shipped to the user. Alternatively, the item could be shipped to the host, and then reshipped to the user. For obvious reasons, the prior is preferred.

As with the previous method, additional funds may need to be received (or at least secured) from the user before the item is purchased at step 418, depending on the amount wagered and the amount received at step 414. For example, if the purchase price (e.g., price for the item, price to ship the item, etc.) is $200, the wager amount is $100, and the wager amount was received at step 414, then no additional funds are due. This is because the wagering activity was performed with the understanding that the user would get the item for $100 (paid at step 414) if the user won the wager. Thus, as before, the need to receive (or secure) additional funds is based on the purchase price (e.g., price of the item, price to ship the item, etc.), the wagering amount, and the amount of funds already received from the user. Simple math can be used to determine whether a balance is due before the item is purchased from the merchant.

The same math can be used to determine whether money should be refunded to the user or a security hold released. For example, if the purchase price is $200, the wager amount is $200, and the wager amount was received at step 414, then $200 would need to be refunded to the user. By way of another example, if the purchase price is $200, the wager amount is $200, and the user's payment method was used to secure $200 (i.e., a security hold was placed on $200), then the security hold would need to be released. As will be apparent to those skilled in the art, whether funds are received, secured, returned, and/or released is a design choice. Funds can be secured or received. If the user wins the wager, and the amount secured or received is greater than the amount due, then the balance will be released or returned. If the user wins the wager, and the amount secured or received is less than the amount due, then the balance will be secured or received, preferably before the item is purchased from the merchant. What is preferred, however, is that the amount wagered is received or secured before the wagering activity, or before the user wins or loses their bet, hence the reason for receiving certain funds (i.e., at least the amount wagered) at step 414.

With reference back to FIG. 4, if the user loses at step 416, the user may have the option of placing another wager at step 412. If the user decides against wagering, the user may have the option of purchasing the item at step 422. If the user decides to purchase the item, then funds are received from the user at step 424 (i.e., the purchase price), the host purchases the item from the merchant at step 418, and the item is provided (e.g., shipped) to the user at step 420, ending the method at step 426. Alternatively, if the user decides not to purchase the item, then the method comes to an end at step 426.

It should be appreciated that the second embodiment of the present invention is not limited to the method recited in FIG. 4, and other methods including fewer, additional, or different steps are within the spirit and scope of the present invention. For example, as discussed above, funds may be secured instead of received at step 414. By way of another example, funds may be secured, received, released, or returned before step 418, depending on a balance due or owed after the wager activity (see discussion above). By way of yet another example, step 404 may be deleted, and step 406 may be deleted or moved to after step 408. In other words, the user is not selecting a merchant (or store), but an item offered by any merchant supported by the host. The host may then decide to identify or not identify the merchant selling the item (again, this is a design choice). In this example, the host could then login to the merchant's website after an item has been selected (moving step 406 to after step 408) or may already be logged into the merchant's website (deleting step 406 altogether).

It should also be appreciated, as discussed above, that the user is shopping on (or logged into) the host's website, whereas the host is shopping on (or logged into) the merchant's website. When the user selects an item, the item is placed in the host's virtual shopping cart on the merchant's website. This is done to secure the item, making the item available later (e.g., after the wagering activity, etc.). If the user decides not to purchase the item, the host removes the item from the cart. If, however, the user wins the item, or wins a portion of the item and pays the remainder to the host, then the host will purchase the item from the merchant. It is this dual shopping experience that allows the user to select an item from the merchant, and the host to purchase the item from the merchant. Because the merchant is oblivious to the wagering activity (in this embodiment), the item price does not change regardless of whether the user wins or loses their wager. Thus, the merchant is expecting full price, and the user is expecting a reduced price if the wager is won. This is accomplished using the dual shopping experience described herein, where the user shops on the host's website, and the host shops (for the user) on the merchant's website.

In this embodiment, the host can make money in several ways. The host may charge the user a fee to use the host's website (e.g., to participate in a wager activity, etc.), the host may receive advertising revenue (e.g., relying on increased traffic due to the wagering feature), and/or charge the merchant a fee. The merchant fee could be a commission or rebate for items purchased through the host, or it could be a reduced purchase price for items purchased by the host. If a reduced purchase price is provided, then either the merchant or the host may alter the content that is presented to the user so that the user sees the original (user) purchase price, and not the reduced (host) purchase price. If the alteration is performed by the merchant, then the original purchase price is provided to the host and displayed to the user. If the alteration is performed by the host, then the reduced purchase price is provided to the host and altered (e.g., back to the original purchase price) before it is displayed to the user. This may be accomplished by rendering at least the portion of the merchant's website that includes the purchase price in the host's memory, and altering portions (e.g., portions showing prices) before they are displayed to the user (e.g., adding 20% to the purchase price if a 20% discount is being offered).

Figure 5A:
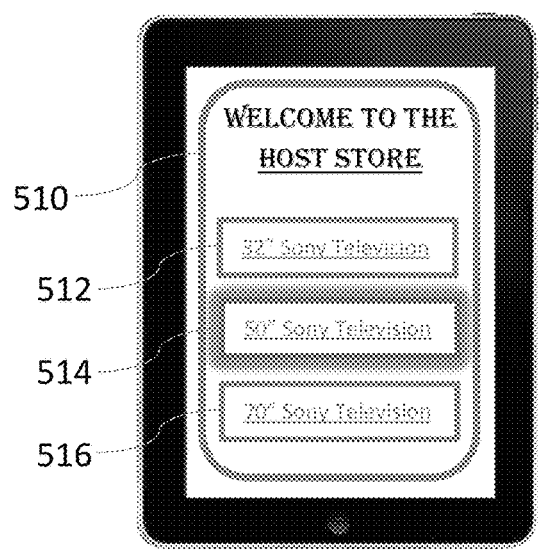
Figure 5B:

Exemplary screen shots of the second embodiment of the present invention can be seen in FIGS. 5A-L. As shown in FIG. 5A, the user may "point" a web browser 510 to the host's website (e.g., by entering the host's URL in the address bar of the browser, etc.). The user can then either select from a plurality of items (see FIG. 5A) or from a plurality of merchants (see FIG. 5B). For example, if the user is looking to purchase a television, the user may select from televisions offered by the host, e.g., a 32-inch Sony™ Television 512, a 50-inch Sony™ Television 514, or a 70-inch Sony™ Television 516. See FIG. 5A. Alternatively, the user may select from merchants offered by the host, e.g., www.123store.com 518, www.abcstore.com 520, or www.xyzstore.com 522. See FIG. 5B. Once a merchant has been selected, the user can then select from televisions offered by the merchant, e.g., a 32-inch Sony™ Television 320, a 50-inch Sony™ Television 322, or a 70-inch Sony™ Television 324. See FIG. 5C. Whether merchants are hidden from the user is a matter of design choice. What is not, in this embodiment, is the dual shopping experience, where the user is shopping on the host's website, and the host is shopping on the merchant's website. For example, in FIG. 5C, web browser 510 is the user's web browser, showing the user's session with the host, whereas web browser (or window) 310 is the host web browser (or window), showing the host's session with the merchant.

Figure 5C:
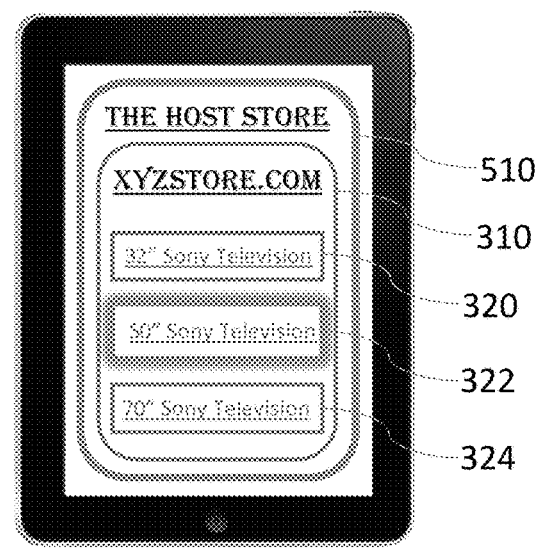
Figure 5D:
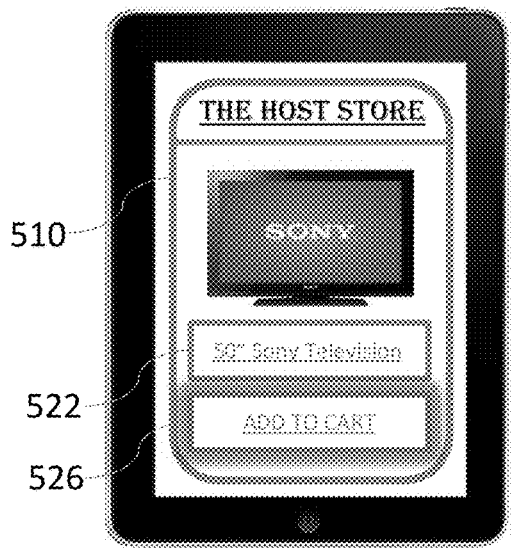

Referring to FIG. 5A or 5C, the user may select the 50-inch Sony™ television (e.g., by clicking on the hyperlink associated with the "50" Sony Television"). As shown in FIG. 5D, the user may then be presented with information on the selection, including an image of the selection and information on the selection 322. The user may then have the option of adding the selection to a virtual shopping cart (i.e., the virtual shopping cart associated with the host) by clicking on the hyperlink entitled "ADD TO CART."

Figure 5E:
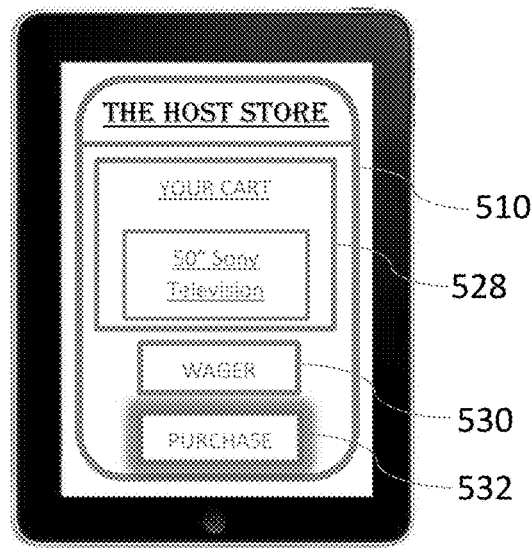
Figure 5F:
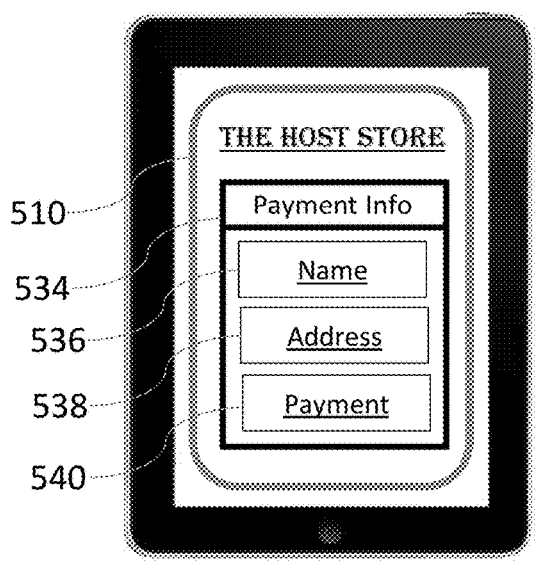

As shown in FIG. 5E, the user may then be provided with the content of their virtual shopping cart 528, which in this example is the 50-inch Sony™ television, with options to either wager or purchase the television. If the user is not interested in gambling, the user can select the "Purchase" button 532. As shown in FIG. 5F, the user would then enter payment information 534, which may include the user's name 536, address 548, and a payment method 540 (e.g., Citibank, Mastercard, Visa, PayPal, Zelle, etc.). Other information may also be required, such as shipping information (not shown). Alternatively, if the user logged into the host's website upon arrival, payment and/or shipping information linked to the user's account (as previously provided) may be used to facilitate the transaction. The host would then enter similar information with the merchant (see, e.g., FIG. 3E), providing the merchant with payment information for the item, and a shipping address, which is preferably an address provided by the user. This way, the host receives funds from the user for the item, the merchant receives funds from the host for the item, and the item is shipped to the user. Again, this is part of the "dual shopping experience."

If the user is interested in gambling, the user can select the "Wager" button 530.

Figure 5G:
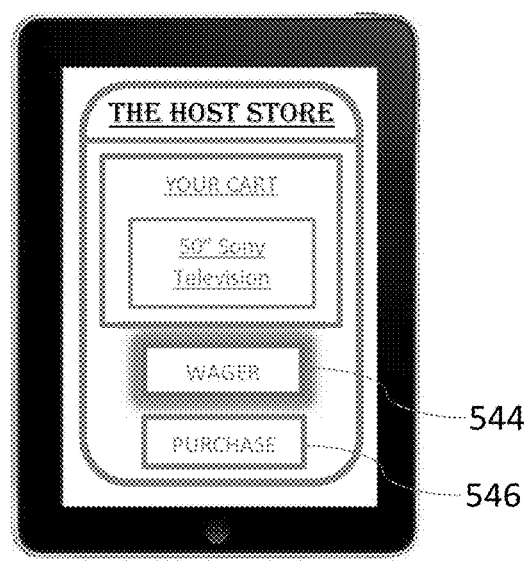
Figure 5H:
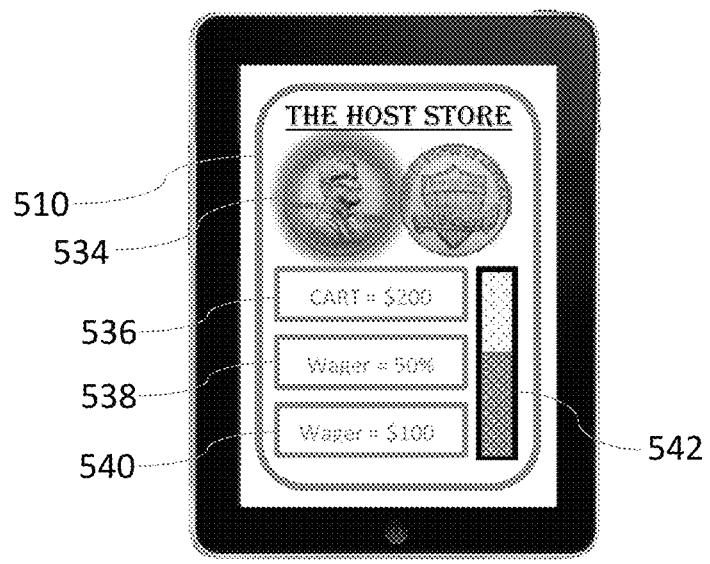

See FIG. 5G. As shown in FIG. 5H, the user can then predict an outcome, which in this example is either head or tails 534. The user can then decide how much the user would like to wager. This may be accomplished by sliding a bar 542, entering an amount 540, entering a percentage 538, or it may be fixed (or capped) by the host (not shown). In this example, the television costs $200 and the user has chosen to wager 50%, or $100. Thus, if the user wins the wager, the user can purchase the television for $100. If the user loses the wager, the user loses their $100 wager, and the television purchase price remains at $200.

Figure 5J:
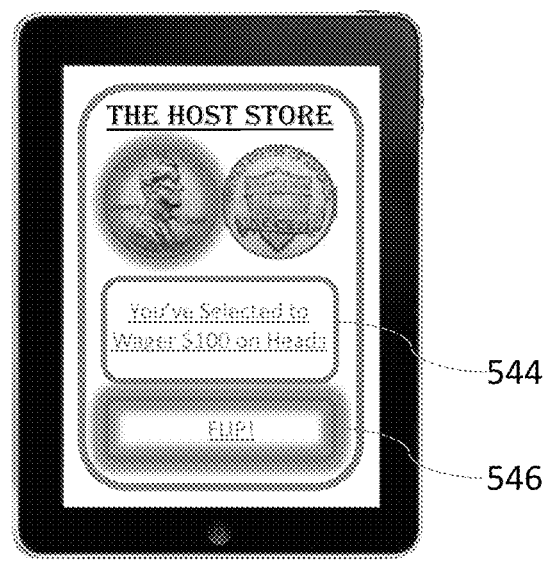
Figure 5K:
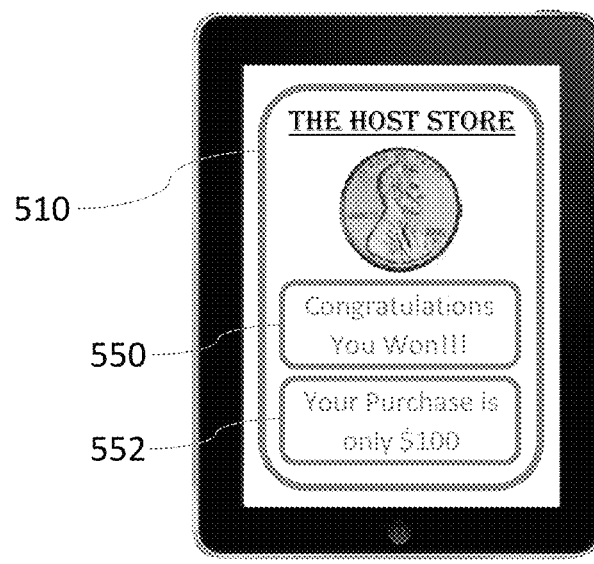
Figure 5L:
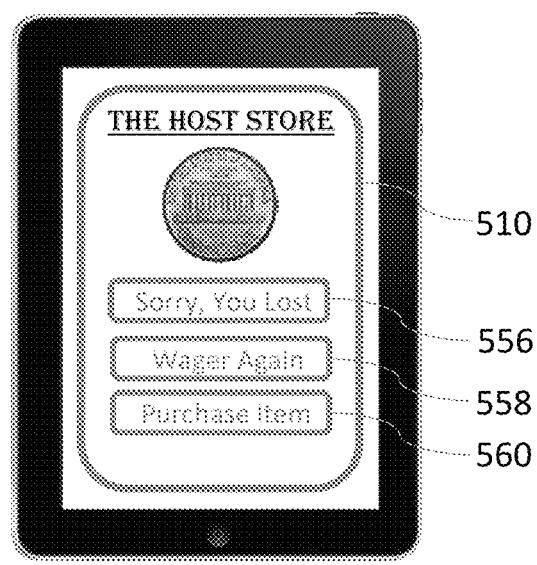

As shown in FIG. 5J, once the user has set the wager, the host may provide the user with a summary of the wager 544, and an opportunity to initiate the flipping of the coin (e.g., by pressing the "Flip!" button). As stated earlier, this initiation of the flip may be used to determine the outcome of the wager, thereby ensuring that the wager is conducted in a fair, transparent, and verifiable manner (see discussion below). As shown in FIG. 5K, if the user's predicted outcome matches the outcome of the wager (e.g., the user selects heads and the upward facing surface of the coin is heads), then the user will be notified that they won 550, and that the item has been purchased for a reduced or null amount 552 (depending on the wager amount). As shown in FIG. 5L, if the user's prediction outcome does not match the outcome of the wager, then the user is notified that they lost 556, and given the option to wager again 558, or purchase the item 560 (e.g., at the original purchase price). If the user decides to wager again, the user may be given content similar to that shown in FIG. 5H. Alternatively, if the user decides to purchase the item, the user may be presented with content similar to that shown in FIG. 5F.

It should be appreciated that the second embodiment of the present invention is not limited to the screen shots shown in FIGS. 5A-L. For example, the wagering activity may be something other than flipping a coin, or the user may be allowed to select from a plurality of wagering activities (e.g., flip a coin, roulette, dice, etc.). As before, the user should receive the true odds benefit of the wager. If the odds are 1:1, then the user should be able to purchase the item for half the original purchase price if the wager is won. If the odds are 4:1, then the user should be able to purchase the item for a quarter of the original purchase price if the wager is won.

An interesting aspect of this embodiment is the dual shopping experience, which allows the user to place items in the host's virtual shopping cart on the merchant's website. If the item is to be purchased, it is the host that purchases the item from the merchant, where the item is (preferably) shipped to the user. The host, on the other hand, may receive the entire purchase price from the user (e.g., if the user decides to purchase the item without wagering), more than the purchase price (e.g., if the user decides to purchase the item after wagering and losing), or less than the purchase price (e.g., if the user wins the wager). Hence, the dual shopping experience, where the two shoppers work together to provide features that otherwise would not be available if the user went directly to the merchant's website. This symbiotic relationship, which may or may not be known to the merchant and/or user, is an improvement in computer technology that is required to practice this embodiment on the Internet and require to provide the user with a simple, straight-forward, and comfortable ecommerce/wagering experience.

In a third embodiment of the present invention, the merchant (i.e., an ecommerce website offering items for sale, such as Amazon™) is not involved in the wagering activity. Like the second embodiment, the wagering activity is allowed and operated by a host in communication with both the merchant and the user via the Internet. In this embodiment, however, the user is free to surf the Internet and purchase items from merchants of their choice. In other words, they are not shopping on the host's website. Instead, they are shopping directly with the merchant.

Figure 6:
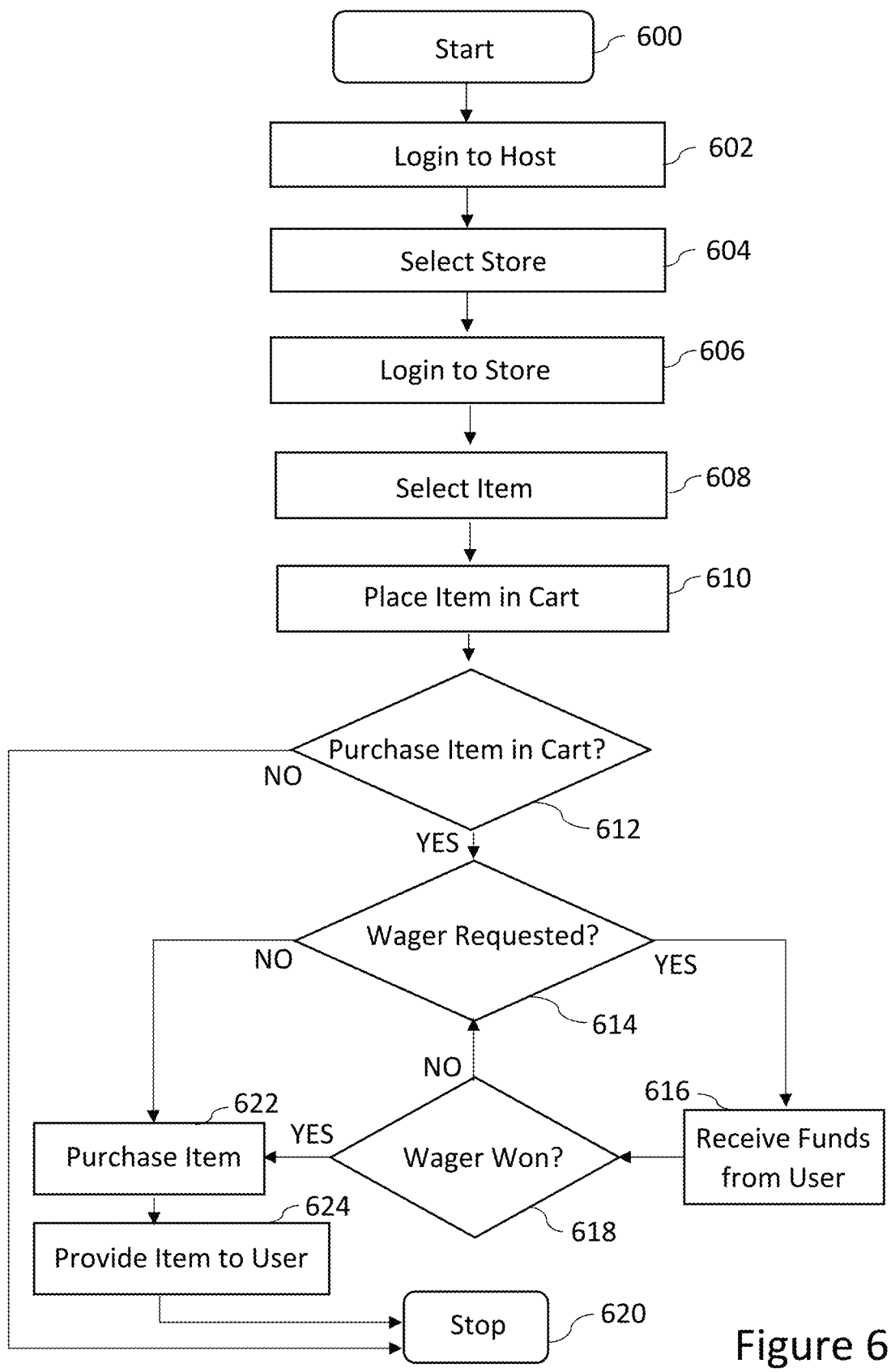
FIG. 6 illustrates a method for incorporating a wagering activity into an ecommerce transaction in accordance with a third embodiment of the present invention.
Figure 7A:
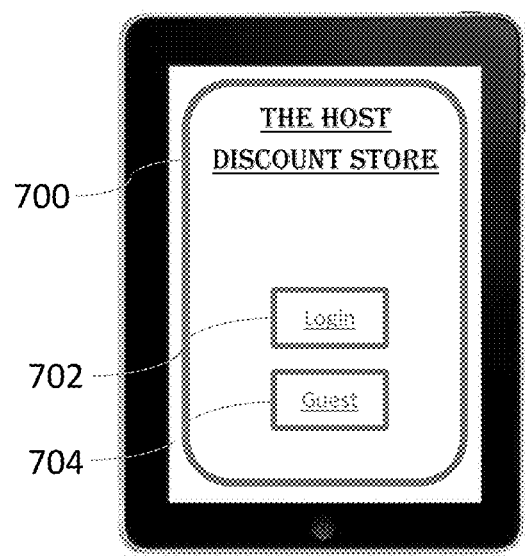
FIGS. 7A and 7B provide exemplary screen shots in accordance with the third embodiment of the present invention.

As shown in FIG. 6, the method starts at step 600, where the user logs into the host at step 602. An exemplary screen shot of this can be seen in FIG. 7A, where the user can login to the host 700 via the "Login" button 702 or proceed as a guest via the "Guest" button 704. The login information (e.g., user name, password, biometric data, etc.) is used to authenticate the user, and identify the user's account on the host 700. It should be appreciated that the host in this embodiment may be located remote from the user device (e.g., over the Internet) or on the user device (e.g., as an application or a program). At step 604, the user may then select a merchant (or store) from a plurality of merchants (or stores) available on the Internet. Again, this not through the host, but via a web browser. See, e.g., FIG. 3A. The user may then login to the merchant (or store) at step 606 and select an item at step 608. This can be seen, for example, in FIG. 7B, where the user's web browser 310 is used to select an item, such as a television, from the xyzstore. The user can then place the item in his/her virtual shopping cart on the merchant's website at step 610. Again, in this embodiment, this is the user's virtual shopping cart, not the host's virtual shopping cart.

Figure 7B:
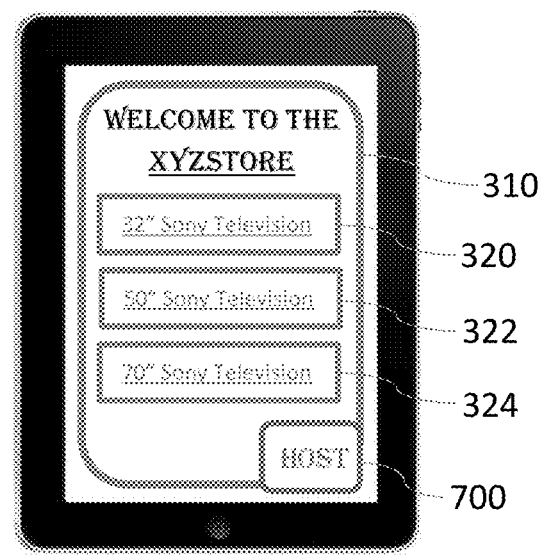

A determination is then made as to whether the user would like to purchase the item (e.g., 50-inch Sony™ television) in the cart at step 612. If the answer is NO, the method ends at step 620. If the answer is YES, then a determination is made as to whether the user would like to wager at step 614. It should be appreciated that while the user is shopping on the merchant's website, the host 700 is operating in the background and monitoring the user device and its interaction with the merchant's website. See, e.g., FIG. 7B, showing the host 700 operating in the background. This way the host 700 can intervene prior to the user purchasing the item from merchant. Once a purchase is indicated (e.g., step 612), the host (e.g., via a pop-up) may ask the user whether the user would like to wager (e.g., step 614). If the answer is NO, then the user provides the merchant with payment information at step 622 (see, e.g., FIG. 3E), the item is provided (e.g., shipped) to the user at step 624, ending the method at step 624. Alternatively, if the answer is YES, then the host receives (or secures) funds from the user at step 616, which may be accomplished via a payment method provided by the user, or previously provided by the user and linked to the user's account with the host. If the wager is lost at step 618, then the user is provided with another opportunity to wager at step 614. If the wager is won at step 618, then the item is purchased by the host at step 622, provided (e.g., shipped) to the user at step 624, ending the method at step 620.

Unlike the second embodiment, it is the user here that has an active session with the merchant. Thus, for the host to purchase the item for the user, the host may use the user's web browser (i.e., the user's session with the merchant) to provide host payment information to the merchant. For example, when payment information is requested from the user (see, e.g., FIG. 3E), the host may intervene and populate the fields with host payment information (instead of user payment information), thereby allowing the host to purchase the item from the merchant, where the item is (preferably) shipped to the user. In an alternate embodiment, the host may create a second (host) session with the merchant (e.g., placing the same item in the host's virtual shopping cart, etc.) and use the second session to provide host payment information to the merchant. In yet another embodiment, the host may allow the user to purchase the item from the merchant, and credit the user's account (e.g., the user's account with the host (e.g., for future wagers, etc.), the user's account with a third party (e.g., the user's Citibank account, PayPal account, etc.), etc.).

As with previous methods, additional funds may need to be received (or at least secured) from the user before the item is purchased at step 622, depending on the amount wagered and the amount received at step 616. For example, if the purchase price (e.g., price for the item, price to ship the item, etc.) is $200, the wager amount is $100, and the wager amount was received at step 616, then no additional funds are due. This is because the wagering activity was performed with the understanding that the user would get the item for $100 (paid at step 616) if the user won the wager. Thus, as before, the need to receive (or secure) additional funds is based on the purchase price (e.g., price of the item, price to ship the item, etc.), the wagering amount, and the amount of funds already received from the user. Simple math can be used to determine whether a balance is due before the item is purchased from the merchant.

The same math can be used to determine whether money should be refunded to the user or a security hold released. For example, if the purchase price is $200, the wager amount is $200, and the wager amount was received at step 616, then $200 would need to be refunded to the user. By way of another example, if the purchase price is $200, the wager amount is $200, and the user's payment method was used to secure $200 (i.e., a security hold was placed on $200), then the security hold would need to be released. As will be apparent to those skilled in the art, whether funds are received, secured, returned, and/or released is a design choice. Funds can be secured or received. If the user wins the wager, and the amount secured or received is greater than the amount due, then the balance will be released or returned. If the user wins the wager, and the amount secured or received is less than the amount due, then the balance will be secured or received, preferably before the item is purchased from the merchant. What is preferred, however, is that the amount wagered is received or secured before the wagering activity, or before the user wins or loses their bet, hence the reason for receiving certain funds (i.e., at least the amount wagered) at step 616.

It should be appreciated that the third embodiment of the present invention is not limited to the method recited in FIG. 6, and other methods including fewer, additional, or different steps are within the spirit and scope of the present invention. For example, as discussed above, funds may be secured instead of received at step 616. By way of another example, funds may be secured, received, released, or returned before step 620, depending on a balance due or owed after the wager activity (see discussion above).

It should also be appreciated that while the third embodiment may only require a single shopping experience (i.e., the user shopping on the merchant's website), the host's ability to monitor this experience, provide the user with a gaming activity (e.g., via a pop-up), and intervene to provide host payment information to the merchant (e.g., via the user's session with the merchant) provides a solution that is rooted in computer technology in order to overcome a problem that arises when this embodiment is implemented on the Internet. In other words, both the single and dual shopping experience platforms (i.e., the second and third embodiments) are intended to address Internet-centric challenges.

Regardless of how the hosts functions, in either embodiment, it must store (or have access to) information on the users, merchants, sessions, etc. For example, as shown in FIG. 8, a database may be used to store a plurality of user accounts 800, where each account is different (e.g., user_account_1, user_account_2, etc.). Each account may be linked to login information 810 (e.g., user_ID, password, biometric data, etc.), payment information 820 (e.g., name, address, payment method, etc.), and shipping information 830 (e.g., where items should be shipped). This information can be used by the host during a user's session with the host. For example, login information can be used to authenticate the user and their account with the host, which can then be used to retrieve previously provided payment and shipping information (e.g., user payment information may be used to fund a wager, and user shipping information that may be provided to the merchant when the host purchases an item from the merchant).

As shown in FIG. 9, a database (e.g., the same database, a different database, etc.) may be used to store a plurality of merchants (or websites) 900, where each merchant is associated with at least one host account 910, having corresponding login information 920 and payment information 930 (i.e., host payment information). It should be appreciated that the host may have multiple accounts with a single merchant, thereby allowing multiple users to shop at the same time from the same merchant. This would allow the host to open a first host session with a first merchant in response to a first user session with the host, open a second session with first merchant in response to a second user session with the host, etc. That way, multiple virtual shopping carts on the merchant's website can be created and used; one for each user.

As shown in FIG. 10, a database (e.g., the same database, a different database, etc.) may be used to store a plurality of user sessions 1000, where each user session is linked to a user (e.g., user account 800), a merchant (e.g., a website 900), a host session with the merchant (e.g., host account 910), and session details 1002. Exemplary session details 1002 are provided in FIG. 11. The details may include, for example, items (e.g., quantity, type, etc.) that are in the virtual shopping cart 1100, total purchase amount 1102 (e.g., purchase price, tax, shipping, etc.), wager amount 1104, and wager details 1106.

Figures 11, 12, 13:
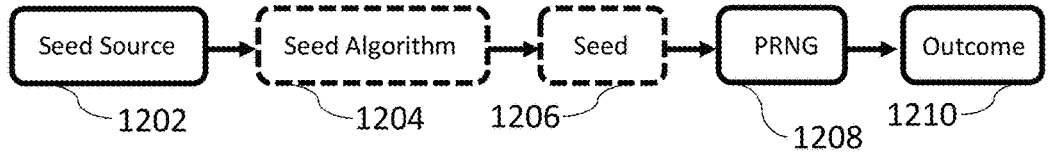
FIG. 11 provides an exemplary database for storing session details for each user session identified in FIG. 10.
FIG. 12 provides an exemplary algorithm for determining an outcome of a wagering activity, involving a Seed and a Pseudo Random Number Generator (PRNG)
FIG. 13 provides an exemplary database for storing wager details for each user session identified in FIG. 10.

The wager details may depend on the wagering activity (e.g., wager type, predicted outcome, actual outcome, how the outcome is determined, etc.). As shown in FIG. 12, the host may use a Pseudo Random Number Generator (PRNG) 1208 to determine an outcome 1210. A PRNG uses a seed (e.g., a random seed) to determine a random number, or outcome. If the same seed is used, then the PRNG produces the same outcome. Thus, it is the random seed that produces a random outcome. As such, the only way to manipulate the outcome (assuming the PRNG is fixed) is to manipulate the seed.

As discussed above, it is of great importance that the system remains trustworthy, transparent, and verifiable. Using the algorithm shown in FIG. 12, this can be done using a seed source that is PROVIDED to the host, not CREATED or SELECTED by the host. This could be, for example, information on time (e.g., down to the millisecond, as determined by the atomic clock), national debt, or any other value that is constantly changing, and (preferably) at a rapid pace (e.g., so that the user cannot manipulate or influence the outcome). When the user initiates the wager (see, e.g., FIG. 3H) (e.g., by clicking on the "Flip!) button), the host may then retrieve a seed from the designated (preferably external) source. By using an external source, where the source is constantly changing, and the user initiates the query (i.e., is responsible for when the seed source is captured), the user can be insured that the seed, and therefore the outcome, is truly random, and not manipulated or predetermined by the host. Such a method is also verifiable, as the same outcome can be reproduced later (e.g., during an audit).

It should be appreciated that the present invention is not limited to the algorithm shown in FIG. 12. Other methods for determining an outcome, such as a Random Number Generator (RNG), a plurality of RNGs, or a combination of RNGs and PRNGs, is within the spirit and scope of the present invention. Similarly, if a PRNG is used, other seed sources may be used, regardless of whether the source is external, internal, changing, static, or used in its entirety. For example, a seed source may be a very long number (e.g., day, month, year, hour, minute, second, etc.). Thus, a seed algorithm 1204 may be used to convert (e.g., reduce, etc.) the seed source into a seed for the PRNG. For example, if the seed source is a 12-digit value, the seed algorithm may create a 4-digit seed using the first and last 2-digits of the 12-digit value (e.g., 123456789098→1298).

To prevent the user from manipulating or influencing the outcome, steps may be taken to randomize the process further. For example, different seed sources could be used (e.g., a first seed source the first time the user uses the system, a second seed source the second time the user uses the system, etc.), different seed algorithms could be used (e.g., a first seed algorithm the first time the system is used, a second seed algorithm the second time the system is used, etc.), and/or different PRNGs could be used (e.g., a first PRNG the first time the user uses the system, a second PRNG the second time the user users the system, etc.). In order to provide verifiable outcomes (e.g., outcomes that can be reproduced), wager details should be kept in a database. For example, as shown in FIG. 13, the system may store, for each session, the predicted outcome 1300, the seed source 1202, the seed algorithm 1204, the seed 1206 (e.g., the result of the seed algorithm operating on the seed source), the PRNG, and the actual outcome 1210.

Figure 14:
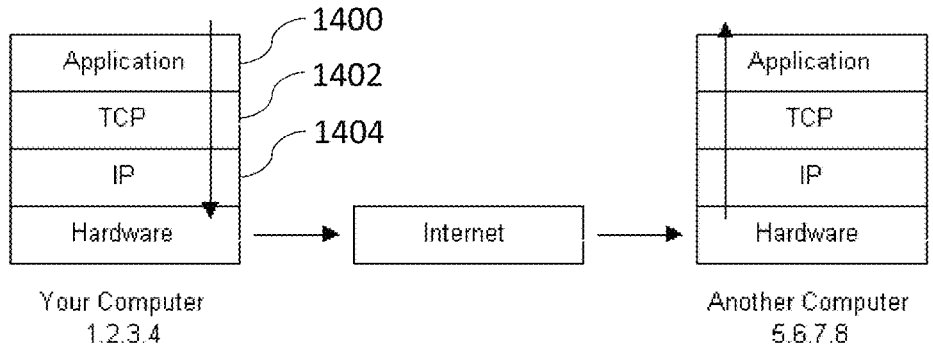
FIG. 14 illustrates how applications (e.g., operating on devices) generally communicate over the Internet.
Figure 15:
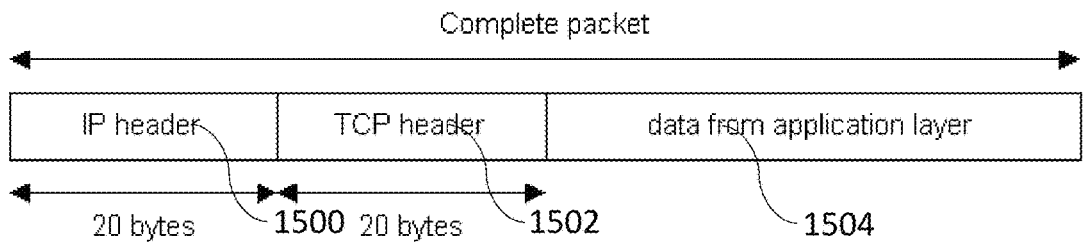
FIG. 15 illustrates a typical packet that may be communicated over the Internet.

Referring back to FIG. 12, the user may feel even more involved (and more confident in the system) if the user provides the seed source, as opposed to merely the triggering the capture of the seed source. For example, when the user initiates the wager activity (e.g., clicks the "Flip!" button), data packets are provided from the user computer to the host computer via the Internet (e.g., informing the host computer that the user has clicked on the "Flip!" button). This can be seen in FIG. 14, where interacting with a website (e.g., via a web browser), produces data from the application layer 1400 (e.g., web browser), from the Transmission Control Protocol (TCP) layer 1402, and from the Internet Protocol (IP) layer 1404. The hardware layer (e.g., the user device) uses this data to create a complete packet (see FIG. 15), which includes an IP header 1500, a TCP header 1502, and an application layer 1504. Any portion (or the entire portion) of the complete packet can be used as the seed source.

Figure 16:
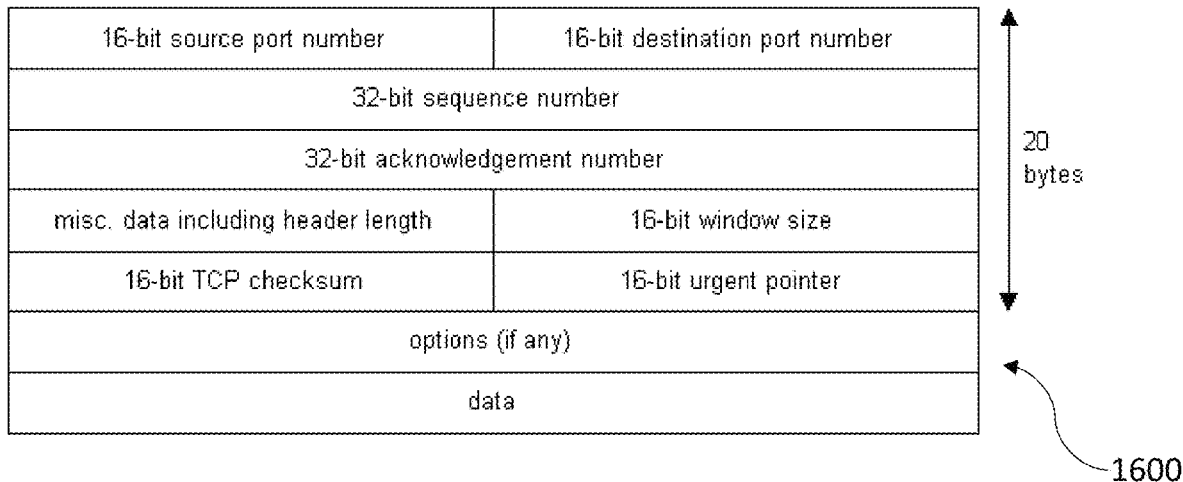
FIG. 16 provides components of a Transmission Control Protocol (TCP) header, as communicated over the Internet during a Hypertext Transfer Protocol (HTTP) request.
Figures 17, 18, 19:
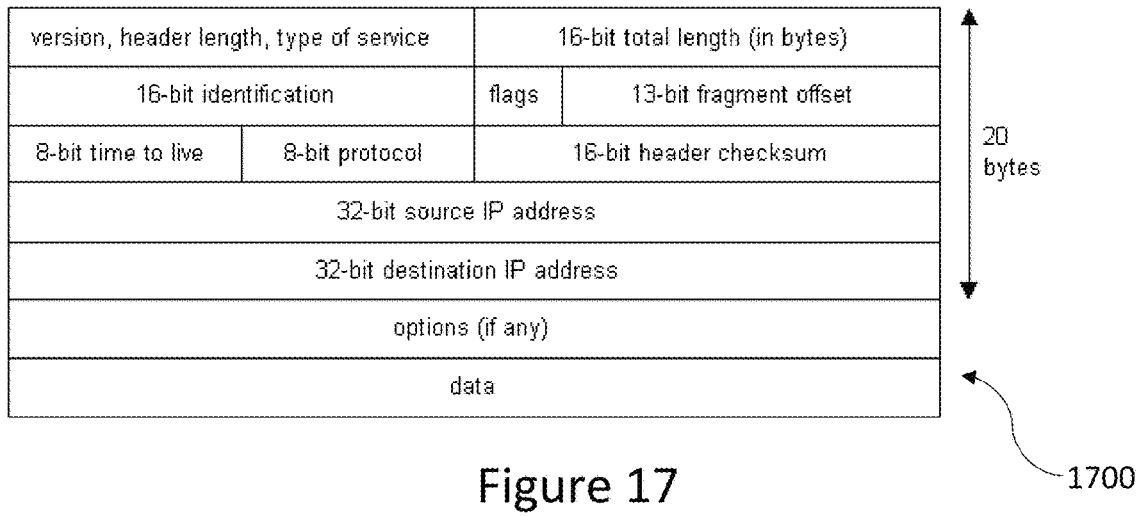
FIG. 17 provides components of an Internet Protocol (IP) header, as communicated over the Internet during an HTTP request.
FIG. 18 provides an exemplary HTTP header, as communicated over the Internet during a HTTP request.
FIG. 19 provides available formats for the "Date" field in the HTTP header illustrated in FIG. 18.

FIG. 16 shows the type of information included in the TCP header 1600, and FIG. 17 shows the type of information included in the IP header 1700. And because we are dealing with a website, the "clicking" of a link ("Flip!") should result in the transfer of a Hypertext Transfer Protocol (HTTP) request from the user device. An example of an HTTP request 1800 is provided in FIG. 18. As shown therein, the HTTP request may include a "Date" field, which includes not only the date, but the time of the request. FIG. 19 shows acceptable ways the "Date" field may be presented.

By using the TCP header, IP header, and/or HTTP request, or any portion thereof as the seed source (or seed), the user should feel confident that the system is trustworthy, and that outcomes are truly random. In fact, the host FAQ section can answer the question "are outcomes truly random" by stating "not only are they random, but your device is responsible for determining the outcome. How is this done? In short, our system relies on a random seed to determine a random outcome, where the random seed is provided by your computer when you request a coin flip. Thus, it is your device that is responsible for the outcome." As before, the seed source may be an input to (or ran through) a seed algorithm to determine the actual seed. Thus, for example, the actual seed may be a value created using the user device's IP address and the date/time the HTTP request was sent (i.e., the "Flip!" button was clicked). Alternatively, if the seed algorithm and/or PRNG changes, the user could also be allowed to enter a value (e.g., their lucky numbers), where the value is either the seed or the seed source.

The foregoing methods for performing a wagering activity (e.g., using a seeded PRNG, where the seed source is provided from an external source (e.g., atomic time, national debt, an HTTP request from the user device, etc.) solves problems that are unique to practicing the invention on the Internet. As discussed above, when gambling at a bring-and-mortar casino, the individual can see the cards being shuffled, the dice being rolled, etc. On the Internet, advancements in computer technology are necessary to convince a user that the system is trustworthy, transparent, and verifiable. The present invention does just that, and therefore constitutes an advancement in computer technology, and is necessary to address problems unique to the Internet.

The foregoing description of a system and method for using a network-connected host device to facilitate a transaction, wherein the transaction involves the purchase of an item from a merchant, where the user can wager (e.g., with the host device) for a least a portion of the purchase price of the item prior to purchasing the item, has been presented for the purposes of illustration and description. It is not intended to be exhaustive or to limit the invention to the precise forms disclosed, and many modifications and variations are possible in light of the above teachings. Those skilled in the art will appreciate that there are a number of ways to implement the foregoing features, and that the present invention it not limited to any particular way of implementing these features. The invention is solely defined by the following claims.

What is claimed is:

1. A system for incorporating at least one wager activity into an electronic commerce transaction, comprising:
   a merchant device associated with a merchant, said merchant device comprising at least one server device and at least one memory device for storing a first set of machine readable instructions; and
   a host device associated with a host, said host device comprising at least one other server device and at least one other memory device for storing a second set of machine readable instructions;
   wherein said first set of machine readable instructions are adapted to perform the steps of:
      receiving via a wide area network (WAN) a selection from a user device operated by a user, said selection selecting an item from a plurality of items available for purchase from said merchant;
      receivng via said WAN a request from said user device to purchase said item, said request resulting in said item being placed into a virtual shopping cart on a website operated by said merchant, said virtual shopping cart being linked to a session identifier; and
      receiving via said WAN a request from said user device to wager on at least a portion of a purchase price of said item in said virtual shopping cart, said request to wager resulting in said merchant device providing to said host device wagering information comprising a wager request, said session identifier, and said purchase price;
   wherein said second set of machine readable instructions are adapted to perform the steps of:
      receiving via said WAN said wagering information from said merchant device;
      receiving via said WAN purchase information, said purchase information comprising (i) payment information, (ii) a wager amount, and (iii) a predictive outcome, wherein at least said wager amount and said predictive outcome are received from said user device and said payment information comprises a first financial account of said user, said first financial account being used to transfer money from said user to said host;
      using said payment information to secure payment of at least said wager amount from said user;
      performing a wager activity resulting in an outcome;
      comparing said outcome with said predictive outcome to determine whether there is a match therebetween;
      using at least second payment information and said session identifier to purchase said item from said merchant when said outcome matches said predictive outcome, said second payment information comprising a second financial account of said host, said second financial account being used to transfer said amount of money from said host to said merchant, said second financial account being separate and distinct from said first financial account; and
      using, at least said session identifier to instruct said merchant device to remove said item from said virtual shopping cart, returning said item to inventory, when said outcome differs from said predictive outcome.

2. The system of claim 1, wherein said payment information is received from said user device.

3. The system of claim 2, wherein said payment information is received prior to receiving said wagering information and linked to a user account with said host.

4. The system of claim 1, wherein said payment information is received from said merchant device.

5. The system of claim 1, wherein said wagering activity is performed using a seed and pseudo random number generator (RNG), at least a portion of the seed comprising at least a portion of at least one hypertext transfer protocol (HTTP) received from said user device.

6. The system of claim 1, wherein said wager amount is a confirmation of an amount set by said host device.

7. The system of claim 1, wherein said second set of machine readable instructions are further adapted to provide said user with an option of wagering again if said outcome differs from said predictive outcome before said step of using said session identifier to instruct said merchant device to remove said item from said virtual shopping cart.

8. The system of claim 5, wherein said HTTP is received from said user device in response to said user interacting with a button that trigger said wager activity.

9. The system of claim 8, wherein at least a portion of said seed comprises at least a time portion of said at least one HTTP request.

10. The system of claim 5, wherein at least a portion of said seed comprises at least a date portion of said at least one HTTP request.

* * * * *